United States Defensive Publication [19] (H) [11] T977,003

Desmarais [43] Dec. 5, 1978

[54] JOINT CEMENT COMPOSITIONS CONTAINING MICA AND QUATERNARY COMPOUNDS

[75] Inventor: Armand J. Desmarais, New Castle, Del.

[73] Assignee: Hercules Incorporated, Wilmington, Del.

[21] Appl. No.: 908,493

[22] Filed: May 22, 1978

[51] Int. Cl.[2] ..... C08L 1/28; C08L 3/02

[52] U.S. Cl. ..... 260/17 R; 106/141; 106/169; 260/17.4 ST

[57] ABSTRACT

Asbestos-free joint cement compositions are disclosed comprised of a binder, mica, calcium carbonate, a thickener, and a specified quaternary ammonium compound.

It has been conventional to replace asbestos with attapulgite clay to provide the body and anti-sagging properties usually associated with asbestos. Attapulgite, however, must be employed at levels which give rise to a severe cracking problem. The interaction of the quaternary compound with the mica gives the formulations sufficient body that the attapulgite and its attendant cracking problem can be substantially eliminated.

2 Claims, No Sheets Drawing,

9 Pages Specification

The file of this unexamined application may be inspected and copies thereof may be purchased (849 O.G. 1221, Apr. 9, 1968).